US010783321B2

(12) United States Patent
Tomita

(10) Patent No.: US 10,783,321 B2
(45) Date of Patent: Sep. 22, 2020

(54) DOCUMENT CREATION SUPPORT DEVICE AND PROGRAM

(71) Applicant: KONICA MINOLTA, INC., Chiyoda-ku, Tokyo (JP)

(72) Inventor: Kouichi Tomita, Hyogo (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 16/354,716

(22) Filed: Mar. 15, 2019

(65) Prior Publication Data

US 2019/0303429 A1 Oct. 3, 2019

(30) Foreign Application Priority Data

Mar. 28, 2018 (JP) .................................. 2018-061864

(51) Int. Cl.
*G06F 40/169* (2020.01)
(52) U.S. Cl.
CPC .................................. *G06F 40/169* (2020.01)
(58) Field of Classification Search
CPC .................................................... G06F 17/241
USPC ........................................................ 715/231
See application file for complete search history.

(56) References Cited

U.S. PATENT DOCUMENTS

2013/0332450 A1* 12/2013 Castelli ............... G06F 16/3344
707/722
2016/0170814 A1* 6/2016 Li .......................... G06F 9/542
719/318
2017/0357625 A1* 12/2017 Carpenter ............ G06F 16/322

FOREIGN PATENT DOCUMENTS

JP 2014038565 A 2/2014

OTHER PUBLICATIONS

Ji, Heng, Ralph Grishman, Zheng Chen, and Prashant Gupta. "Cross-document event extraction and tracking: Task, evaluation, techniques and challenges." In Proceedings of the International Conference RANLP-2009, pp. 166-172. 2009. (Year: 2009).*

* cited by examiner

*Primary Examiner* — Frank D Mills
(74) *Attorney, Agent, or Firm* — Holtz, Holtz & Volek PC

(57) ABSTRACT

A document creation support device that supports work when a new document is created on the basis of a first document that includes at least one first reported matter, includes a hardware processor that: extracts a second reported matter related to the first reported matter from a second document that differs from the first document; and presents support information on the basis of the extracted second reported matter.

8 Claims, 8 Drawing Sheets

FIG. 3A

1. PROJECT AAA ········· TTL  }R1, R
- MEASURES TAKEN AGAINST TONER DISPERSION PROBLEM AT CUSTOMER XX HAVE BEEN COMPLETED, AND FIXED VERSION HAS BEEN PROVIDED IN CUSTOMER ENVIRONMENT. ········· TXT
WAIT TO SEE WHAT WILL HAPPEN WITH FIXED VERSION.

PERSON RESPONSIBLE A
D1, D

| DOCUMENT ID | USER | REGISTRATION DATE | TITLE/ MAIN TEXT | CONTENTS OF SENTENCE | IMPORTANCE FLAG | CONTINUATION FLAG |
|---|---|---|---|---|---|---|
| D1 | PERSON RESPONSIBLE A | 2018/01/01 | TITLE | 1. PROJECT AAA | OFF | OFF |
| D1 | PERSON RESPONSIBLE A | 2018/01/01 | MAIN TEXT 1 | ■ MEASURES TAKEN AGAINST TONER DISPERSION PROBLEM AT CUSTOMER XX HAVE BEEN COMPLETED, AND | ON | OFF |
| D1 | PERSON RESPONSIBLE A | 2018/01/01 | MAIN TEXT 1 | FIXED VERSION HAS BEEN PROVIDED IN CUSTOMER ENVIRONMENT. | ON | OFF |
| D1 | PERSON RESPONSIBLE A | 2018/01/01 | MAIN TEXT 1 | WAIT TO SEE WHAT WILL HAPPEN WITH FIXED VERSION. | ON | ON |

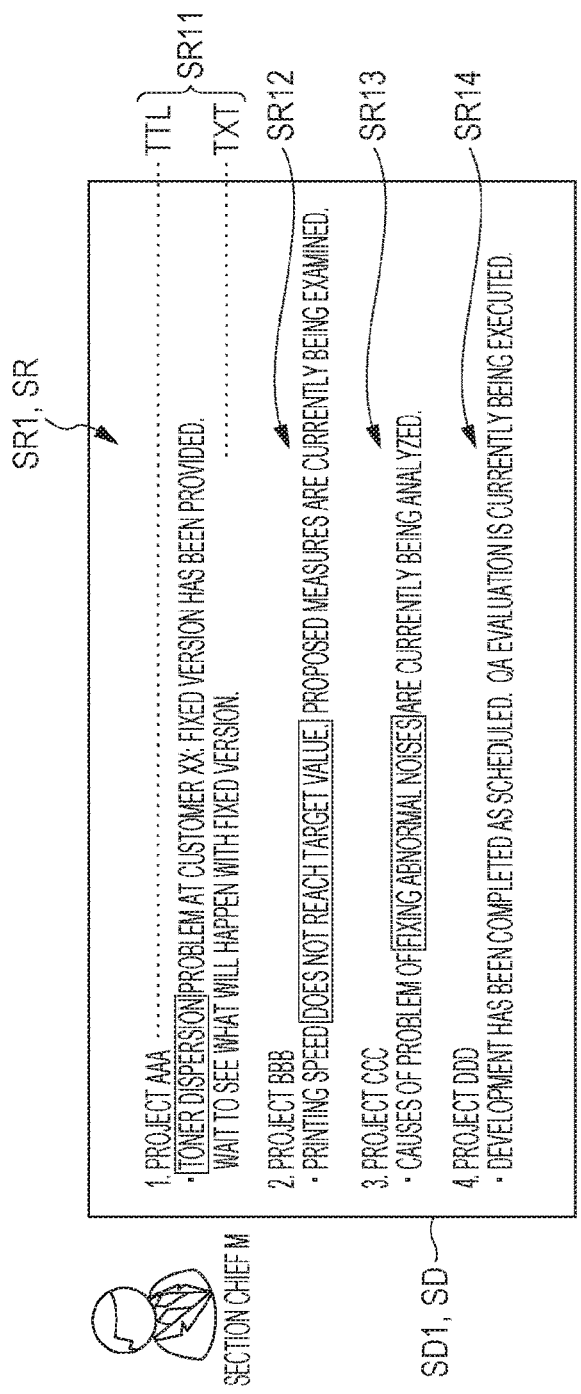

| DOCUMENT ID | USER | REGISTRATION DATE | TITLE/ MAIN TEXT | CONTENTS OF SENTENCE | IMPORTANCE FLAG | CONTINUATION FLAG |
|---|---|---|---|---|---|---|
| SD1 | SECTION CHIEF M | 2018/01/01 | TITLE | 1. PROJECT AAA | OFF | OFF |
| SD1 | SECTION CHIEF M | 2018/01/01 | MAIN TEXT 1 | · TONER DISPERSION PROBLEM AT CUSTOMER XX: FIXED VERSION HAS BEEN PROVIDED. | ON | OFF |
| SD1 | SECTION CHIEF M | 2018/01/01 | MAIN TEXT 1 | WAIT TO SEE WHAT WILL HAPPEN WITH FIXED VERSION. | ON | ON |
| SD1 | SECTION CHIEF M | 2018/01/01 | TITLE | 2. PROJECT BBB | OFF | OFF |
| SD1 | SECTION CHIEF M | 2018/01/01 | MAIN TEXT 1 | · PRINTING SPEED DOES NOT REACH TARGET. PROPOSED MEASURES ARE CURRENTLY BEING EXAMINED. | ON | ON |
| ... | ... | ... | ... | ... | ... | ... |

FIG. 5A

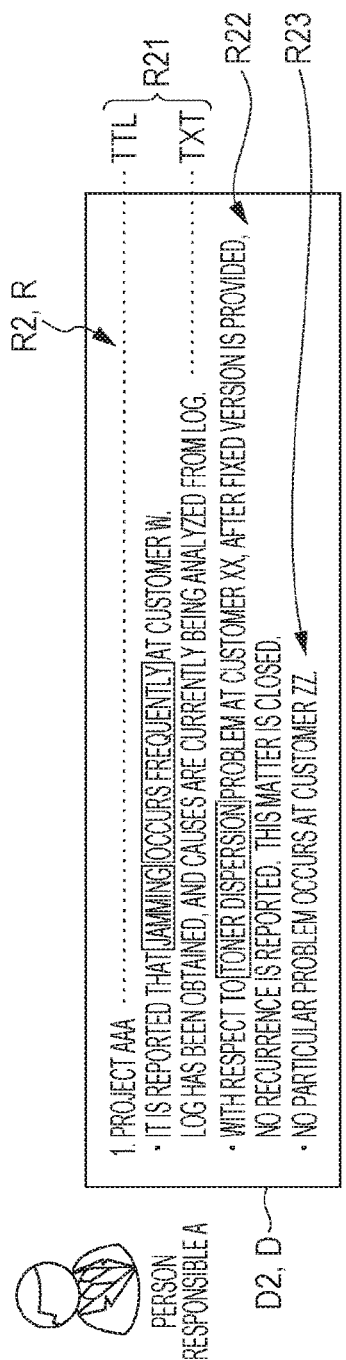

1. PROJECT AAA
- IT IS REPORTED THAT JAMMING OCCURS FREQUENTLY AT CUSTOMER W. LOG HAS BEEN OBTAINED, AND CAUSES ARE CURRENTLY BEING ANALYZED FROM LOG.
- WITH RESPECT TO TONER DISPERSION PROBLEM AT CUSTOMER XX, AFTER FIXED VERSION IS PROVIDED, NO RECURRENCE IS REPORTED. THIS MATTER IS CLOSED.
- NO PARTICULAR PROBLEM OCCURS AT CUSTOMER ZZ.

FIG. 5B

| DOCUMENT ID | USER | REGISTRATION DATE | TITLE/ MAIN TEXT | CONTENTS OF SENTENCE | IMPORTANCE FLAG | CONTINUATION FLAG |
|---|---|---|---|---|---|---|
| D2 | PERSON RESPONSIBLE A | 2018/01/07 | TITLE | 1. PROJECT AAA | OFF | OFF |
| D2 | PERSON RESPONSIBLE A | 2018/01/07 | MAIN TEXT 1 | • IT IS REPORTED THAT JAMMING OCCURS FREQUENTLY AT CUSTOMER W. | ON | OFF |
| D2 | PERSON RESPONSIBLE A | 2018/01/07 | MAIN TEXT 1 | LOG HAS BEEN OBTAINED, AND CAUSES ARE CURRENTLY BEING ANALYZED FROM LOG. | ON | ON |
| D2 | PERSON RESPONSIBLE A | 2018/01/07 | MAIN TEXT 2 | • WITH RESPECT TO TONER DISPERSION PROBLEM AT CUSTOMER XX, AFTER FIXED VERSION IS PROVIDED. | ON | OFF |
| D2 | PERSON RESPONSIBLE A | 2018/01/07 | MAIN TEXT 2 | NO RECURRENCE IS REPORTED. THIS MATTER IS CLOSED. | ON | OFF |
| D2 | PERSON RESPONSIBLE A | 2018/01/07 | MAIN TEXT 3 | • NO PARTICULAR PROBLEM OCCURS AT CUSTOMER ZZ. | OFF | OFF |

FIG. 7A

```
                                    DOCUMENT CREATION
              PLEASE LOG IN

USER ID:      [          ]

PASSWORD:     [          ]

[  LOG IN  ]
```

FIG. 7B

```
                                    DOCUMENT CREATION
        PLEASE SELECT KIND OF DOCUMENT

[   CREATE    ]    [   CREATE    ]
          [WEEKLY REPORT]    [MONTHLY REPORT]
```

DOCUMENT CREATION SUPPORT DEVICE AND PROGRAM

The entire disclosure of Japanese patent Application No. 2018-061864, filed on Mar. 28, 2018, is incorporated herein by reference in its entirety.

BACKGROUND

Technological Field

The present invention relates to a document creation support device, and a program.

Description of the Related Art

In recent years, many companies introduce a document management system that stores and centrally manages computerized documents, thereby enhancing operational efficiency (for example, refer to JP 2014-038565 A). As an example of documents stored in the document management system, there are periodical reports (for example, a weekly report, a monthly report) that are used to grasp contents of operations, the progress, result and the like of the operations. For example, in a case where a boss refers to a document created by a person responsible, and creates a summary-document in which report contents are summarized, efficiency in document creation work is enhanced by using an electronic management system.

In the description below, a document created by a person responsible is designated as "individual document", and a document created by summarizing an individual document by a boss is designated as "overall document". In particular, in a case where the above-described documents are weekly reports, the documents are designated as "individual weekly report" and "overall weekly report" respectively.

When the boss creates an overall document by using the document management system, the boss is capable of efficiently creating the overall document by reflecting contents of an individual document newly registered by the person responsible in a base overall document (for example, an overall weekly report for last week) created last time.

In addition, JP 2014-038565 A discloses a document management device that obtains a first document containing a reported matter, and a second document containing a reported matter edited on the basis of the first document, evaluates ambiguity of each reported matter, and gives attention and advice on the basis of the result of evaluation.

However, since an individual document created by a person responsible contains a large amount of information, there is also a possibility that a boss will forget to reflect contents in an overall document. In particular, in a case where a matter that is not reflected in the overall document is an important reported matter that may cause a problem when operations are carried out, the progress of the operations cannot be correctly grasped, and therefore the operations may be hindered. The document management device disclosed in JP 2014-038565 A does not detect a reported matter that has been forgotten to be reflected in the overall document by the boss. Even attention and advice cannot be given without a change in ambiguity.

SUMMARY

An object of the present invention is to provide a document creation support device that is capable of enhancing work efficiency when a new document (for example, an overall weekly report for this week) is created on the basis of a first document (for example, an overall weekly report for last week), and to provide a program.

To achieve the abovementioned object, according to an aspect of the present invention, there is provided a document creation support device that supports work when a new document is created on the basis of a first document that includes at least one first reported matter, and the document creation support device reflecting one aspect of the present invention comprises a hardware processor that: extracts a second reported matter related to the first reported matter from a second document that differs from the first document; and presents support information on the basis of the extracted second reported matter.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention:

FIGS. 3A and 3B are drawings each illustrating a specific example of an individual weekly report created by a subordinate (a weekly report for last week);

FIGS. 4A and 4B are drawings each illustrating a specific example of an overall weekly report created by a boss (a weekly report for last week);

FIGS. 5A and 5B are drawings each illustrating another example of an individual weekly report (a weekly report for this week);

FIGS. 7A and 7B are drawings each illustrating an example of a user authentication screen.

DETAILED DESCRIPTION OF EMBODIMENTS

Hereinafter, one or more embodiments of the present invention will be described with reference to the drawings. However, the scope of the invention is not limited to the disclosed embodiments.

Figure 1:
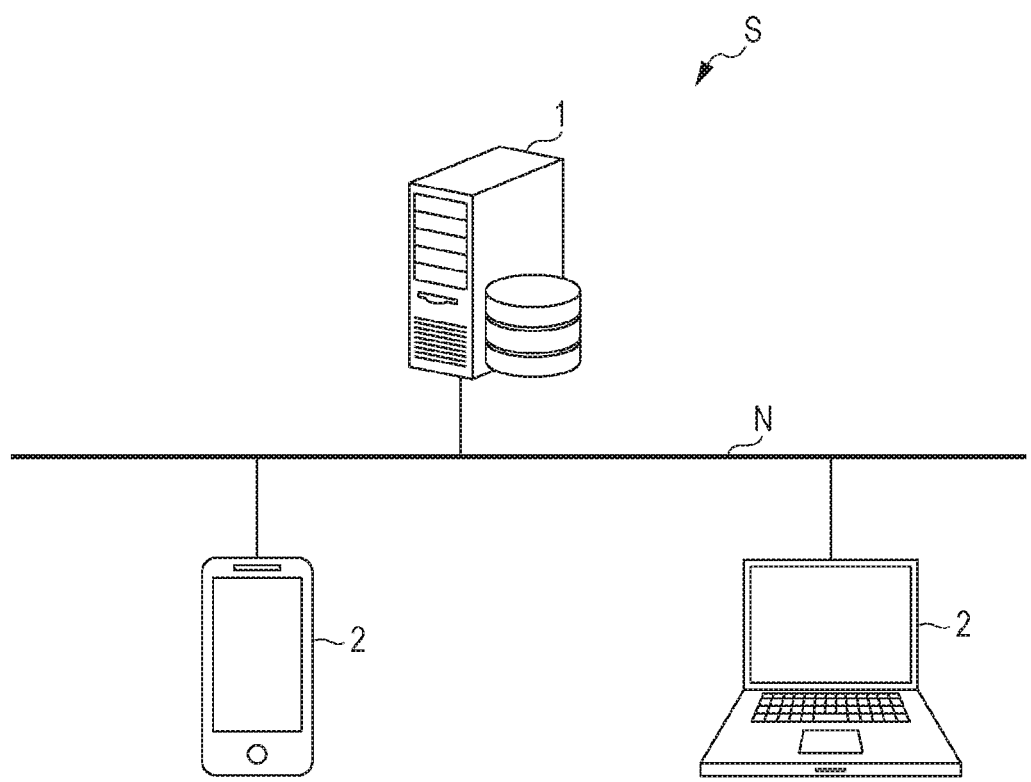
FIG. 1 is a drawing illustrating a document management system to which one embodiment of the present invention is applied.

FIG. 1 is a drawing illustrating a document management system S to which one embodiment of the present invention is applied.

As shown in FIG. 1, the document management system S is provided with a document server 1, and client terminals 2. The client terminals 2 are each connected to the document server 1 so as to enable information communication therebetween through, for example, an intranet N such as wired/wireless local area networks (LANs). Incidentally, although FIG. 1 provides a simplified illustration, a large number of client terminals 2 are usually connected to the document server 1. In addition, the document management system S may be a cloud type service in which the client terminals 2 are connected to the document server 1 through Internet.

The document management system S stores and centrally manages, in the document server 1, documents created in the client terminals 2. By using the document management system 5, users are capable of sharing the documents stored in the document server 1.

The client terminals 2 are, for example, information terminals such as a personal computer, a smart phone or a tablet terminal. By using the client terminal 2 to access the document server 1, each user is capable of browsing the document stored in the document server 1, and is capable of creating a new document, and registering the new document in the document server 1.

The document server 1 is a server computer that stores computerized documents. In the present embodiment, the document creation support device according to an embodiment of the present invention is applied to the document server 1.

Figure 2:
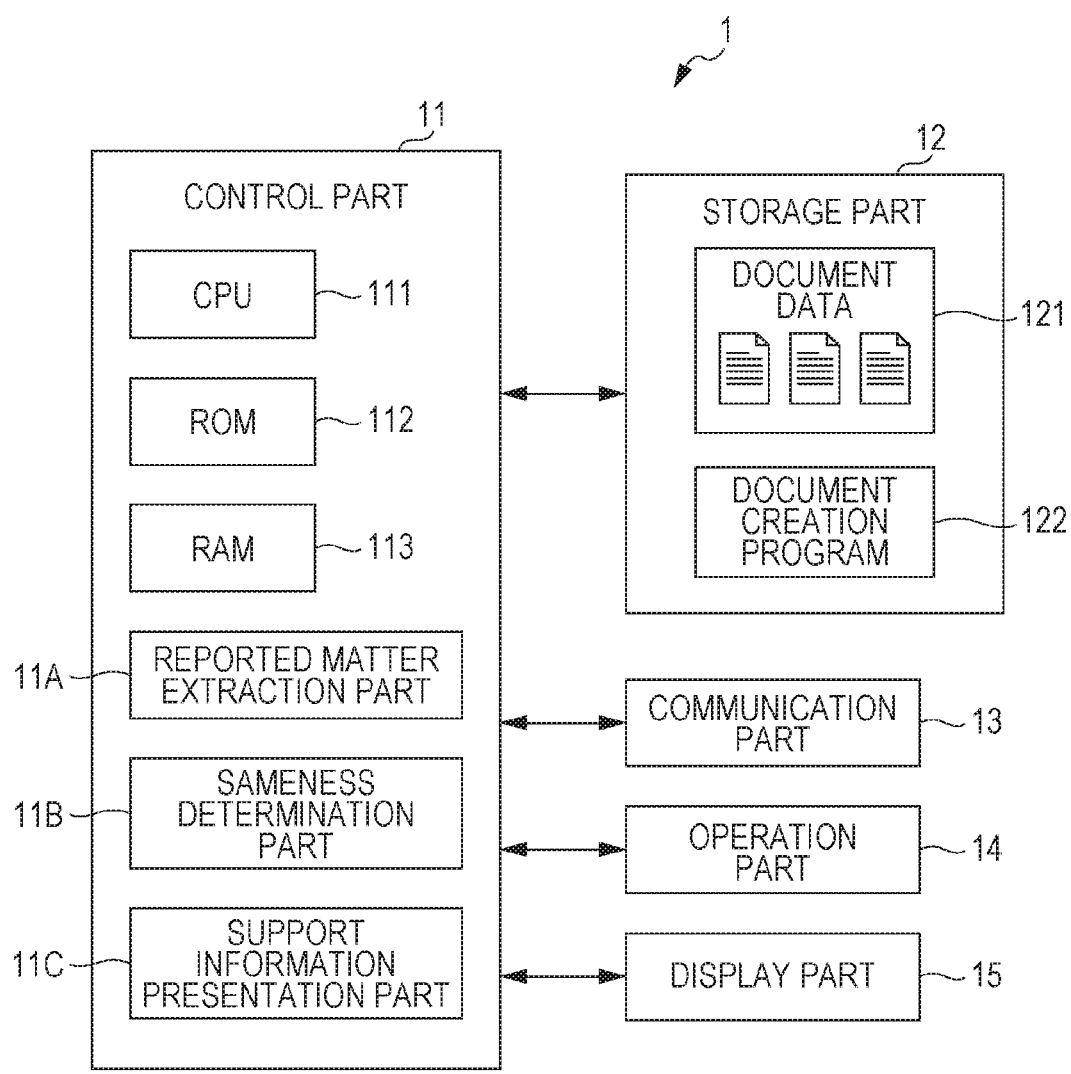
FIG. 2 is a diagram illustrating an example of a hardware configuration of a document server.

FIG. 2 is a diagram illustrating an example of a hardware configuration of the document server 1. As shown in FIG. 2, the document server 1 is provided with a control part 11, a storage part 12, a communication part 13, an operation part 14, a display part 15 and the like. Blocks are electrically connected through bus lines.

The control part 11 includes a central processing unit (CPU) 111 as a computation/control device, a read only memory (ROM) 112 as a main storage unit, and a random access memory (RAM) 113. A basic program and basic setting data are stored in the ROM 112. The CPU 111 reads a program corresponding to processing contents from the ROM 112 or the storage part 12, expands the program in the RAM 113, and executes the expanded program, thereby centrally controlling the operation of each block of the document server 1.

It should be noted that a part or all of processing executed by the control part 11 may be executed by an electronic circuit, such as a digital signal processor (DSP), an application specific integrated circuit (ASIC), and a programmable logic device (PLD), provided corresponding to the processing.

The storage part 12 is an auxiliary storage device, for example, a hard disk drive (HDD), a solid state drive (SSD), a secure digital (SD) card or the like, and stores programs, various data and the like. In the present embodiment, the storage part 12 stores the document registered by the client terminal 2, In addition, the storage part 12 stores a document creation program 122 that causes the control part 11 of the document server 1 to function as a document creation support device. It should be noted that the document creation program 122 may be stored in the ROM 112.

The communication part 13 is a communication interface, for example, a network interface card (NIC), modulator-demodulator (MODEM), a universal serial bus (USB) or the like. The control part 11 transmits/receives, through the communication part 13, various kinds of information to/from the client terminal 2 connected to the network N. A communication interface for short-distance wireless communication, such as a near field communication (NFC) and Bluetooth (registered trademark), can also be applied to the communication part 13.

The operation part 14 is, for example, a keyboard through which characters and numbers can be input, and a pointing device such as a mouse. The display part 15 is a display such as a liquid crystal display or an organic EL display. The operation part 14 and the display part 15 are used, for example, when maintenance of the document server 1 is performed.

By executing the document creation program, the control part 11 functions as a reported matter extraction part 11A, a sameness determination part 11B, and a support information presentation part 11C. These functions will be explained in detail according to a flowchart of FIG. 6.

The present embodiment describes a case where a boss in a company uses the document management system S to refer to the individual weekly reports created by subordinates, and summarizes report contents included in the individual weekly reports to create a summarized overall weekly report. The individual weekly reports and the overall weekly report are created, for example, by accessing the document server 1 using the client terminal 2, and by executing the document creation program 122 of the document server 1.

In the description below, a reported matter included in an individual weekly report is designated as "individual reported matter", and a reported matter included in an overall weekly report is designated as "overall reported matter". The created individual weekly report and the created overall weekly report are stored in the document server 1 for a fixed period of time.

FIGS. 3A and 3B are drawings each illustrating a specific example of an individual weekly report D created by a subordinate. FIGS. 3A and 3B each illustrate an individual weekly report D1 created by a person responsible A. FIGS. 4A and 4B are drawings each illustrating a specific example of an overall weekly report SD created by a boss. FIGS. 4A and 4B each illustrate an overall weekly report SD1 created by a section chief M. The overall weekly report SD1 is an overall weekly report that is created by the section chief M with reference to a plurality of individual weekly reports including the individual weekly report D1.

FIGS. 3A and 4A illustrate examples of display contents of the individual weekly report D and the overall weekly report SD in the client terminal 2 respectively. FIGS. 3B and 4B illustrate configuration examples of document data of the individual weekly report D and the overall weekly report SD respectively.

As shown in FIG. 3A, the individual weekly report D1 includes an individual reported matter R1. In addition, as shown in FIG. 4A, the overall weekly report SD1 includes ail overall reported matter SR1 (overall reported matters SR11 to SR14). In the present embodiment, a group of reported matters each having the same title TTL is designated as "individual reported matter R" or "overall reported matter SR". It should be noted that in the overall weekly report SD1, the overall reported matter SR11 corresponds to the individual reported matter R1, and the overall reported matters SR12 to SR14 correspond to individual reported matters included in the individual weekly report D other than the individual weekly report D1.

In the present embodiment, the individual reported matter R and the overall reported matter SR are input according to predetermined rules, and a logical configuration of report contents is adapted to be easily determined.

Specifically, with respect to the individual reported matter R and the overall reported matter SR, one sentence is composed of character strings, each of which is delimited by a line-head delimiter (here, "number"+"." (period), "·" (centered dot), or a null line), a one-line character string being used as unit. A sentence starting from "number"+"." is designated as "title", and a sentence starting from "·" is designated as "main text". The title and the main text may be composed of a plurality of lines of character strings.

For example, the individual reported matter R1 shown in FIG. 3A is composed of a one-line title TTL starting with "1.", that is to say, "1. Project AAA", and a three-line main text TXT starting with "'", that is to say, "' The measures taken against the toner dispersion problem at the customer XX have been completed, and . . . . Wait to see what will happen with the fixed version."

In addition, for example, the overall reported matter SR11 shown in FIG. 4A is composed of a one-line title TTL starting with "1.", that is to say, "1. Project AAA", and a two-line main text TXT starting with "'", that is to say, "' The toner dispersion problem at the customer XX: a fixed version has been provided. Wait to see what will happen with the fixed version."

As shown in FIGS. 3B and 4B, with respect to document data of the individual weekly report D and the overall weekly report SD, "document ID", "user", "registration date", "title/main text", "sentence contents", "importance flag" and "continuation flag" are registered so as to be associated with one another, for example, on a one-line character string basis. These pieces of information are registered, for example, when the individual weekly report D and the overall weekly report SD are created.

The "document ID" is identification information that is assigned to each individual weekly report D or each overall weekly report SD. The "user" is a user who has created the individual weekly report D or the overall weekly report SD. The "registration date" is the date on which the individual weekly report D or the overall weekly report SD has been registered in the document server 1. The "title/main text" is information indicating which of the title or the main text the character string forms. The "sentence contents" are contents of the character string.

The "importance flag" is information indicating whether or not the sentence (the individual reported matter R or the overall reported matter SR) that includes the character string is an important reported matter. When the sentence that includes the character string is an important reported matter, the "importance flag" is set at "ON", and when the sentence that includes the character string is not an important reported matter, the "importance flag" is set at "OFF", In the present embodiment, whether or not the sentence is an important reported matter is determined on a sentence basis. In a case where one sentence is composed of a plurality of lines of character strings, the importance flags of all character strings are set at the same value.

A determination as to whether or not the individual reported matter R or the overall reported matter SR is an important reported matter can be made on the basis of, for example, a specific word included in the character string. The specific word is, for example, a word indicating a matter that should be regarded as important when carrying out operations, and is registered beforehand. With respect to the individual reported matter D1 shown in FIG. 3A and the overall reported matters SR1 to SR4 shown in FIG. 4A, "toner dispersion", "target value is not reached", and "fixing abnormal noises" correspond to specific words.

It should be noted that a score (weight) indicating an importance level may be set on a specific word basis so as to add up scores of specific words included in character strings that compose a sentence, and in a case where the total score (the integrated value of the scores) is a predetermined value or more, it is determined that the sentence is an important reported matter. In this manner, in a case where one sentence includes a plurality of specific words, the integrated value of scores corresponding to the respective specific words is used as a determination indicator for determining whether or not the sentence is an important reported matter. Consequently, the importance level of the sentence can be properly determined.

The "continuation flag" is information indicating whether or not the character string includes a continuation word. In a case where the character string includes a continuation word, the "continuation flag" is set at "ON", and in a case where the character string does not include a continuation word, the "continuation flag" is set at "OFF". In the present embodiment, although the continuation flag is set on a character string basis, the continuation flag may be set on a sentence basis. The continuation word is a word indicating that a state is continuing. The continuation word is registered beforehand. For example, words such as "measures are currently being taken", "currently being analyzed", "currently being executed", "currently being examined", and "waiting to see what will happen" correspond to continuation words.

It should be noted that as illustrated in the overall weekly report SD1 in FIGS. 4A and 4B, in a case where a plurality of overall reported matters SR are included, each of the overall reported matters SR11 to SR14 has a title TTL and a main text TXT. In this case, the title TTL and the main text TXT are distinguished from the other corresponding to the overall reported matters SR11 to SR14. In addition, with respect to the overall reported matter SR and the individual reported matter R, in a case where the same title includes a plurality of main texts (in a case where there are a plurality of sentences starting with "'"), the main texts are distinguished from one another as follows: a main text 1, a main text 2, . . . (refer to FIG. 5B).

As shown in FIGS. 3A and 4A, the individual reported matter R1 and the overall reported matter SR11 corresponding thereto are not always required to be identical in character string to each other. Analyzing each sentence structure enables to determine whether or not subjects of report contents of both are the same. For example, the individual reported matter R1 and the overall reported matter SR11 each have the main text TXT that includes a word "toner dispersion", and have the same title TTL as well. Therefore, it can be determined that the report contents of both are the same.

In the document management system S, when the section chief M creates the overall weekly report SD2 for this week (refer to FIG. 8), the section chief M is allowed to use the overall weekly report SD1 for last week as a base. For example, when the section chief M logs in the document management system S, and then selects creation of weekly report, a document creation application presents the overall weekly report SD2 that includes report contents of the overall weekly report SD1 for last week (refer to FIG. 8). The section chief M is capable of efficiently creating the overall weekly report SD2 by editing and updating as appropriate the overall reported matter SR1 included in the overall weekly report SD1 for last week, and by adding a new reported matter.

What will be specifically described is a case where in the next week after the overall weekly report SD1 for the last week shown in FIGS. 4A and 4B has been created, the person responsible A registers the individual weekly report D2 shown in FIGS. 5A and 5B, and on the basis of the individual reported matter R2 included in the individual weekly report D2, report contents of the overall weekly report SD1 are updated to create the overall weekly report SD2 for this week.

The individual weekly report D2 shown in FIGS. 5A and 5B includes the individual reported matter R2 (the individual reported matters R21 to R23). In other words, the individual weekly report D2 is updated from the individual weekly report D1 for last week that includes the individual reported matter R1. The individual reported matters R21 to R23 share the same title TTL. Among the individual reported matters R21 to R23, the individual reported matter R22 corresponds to the individual reported matter R1 included in the individual weekly report D1. The individual reported matters R21, R23 are new reported matters that are not reported in the individual weekly report D1.

In this case, the section chief M who has referred to the individual weekly report D2 updates the overall reported matter SR11 of the overall weekly report. SD1 for last week to the contents of the individual reported matter R22, and adds the contents of the individual reported matters R21, R23. Incidentally, since the importance flag is "OFF" in the contents of the individual reported matter R23, the individual reported matter R23 is not an important reported matter. Therefore, a determination as to whether or not the individual reported matter R23 is reflected in the overall weekly report SD2 may be made as appropriate by the section chief M.

As described above, the section chief M creates the overall weekly report SD2 for this week with reference to the individual weekly report D2 for this week that has been created by the person responsible A on the basis of the overall weekly report SD1 for last week. At this point of time, if the section chief M forgets to reflect important reported matters (for example, the individual reported matters R21, R22) in the overall weekly report SD2 for this week, the operations may be hindered.

In the present embodiment, when the overall weekly report SD2 for this week (new document) is created on the basis of the overall weekly report SD1 for last week (the first document), if a matter that requires attention and advice is detected, useful support information is presented to the section chief M (the creator of the new document). Specifically, document creation processing is executed according to a flowchart shown in FIG. 6.

Here, support information includes, for example, information indicating that report contents have been changed (first support information), information indicating that new report contents have been created (second support information), and information indicating that a certain state is continuing for a fixed period of time, and thus attention is required (third support information).

Figure 6:
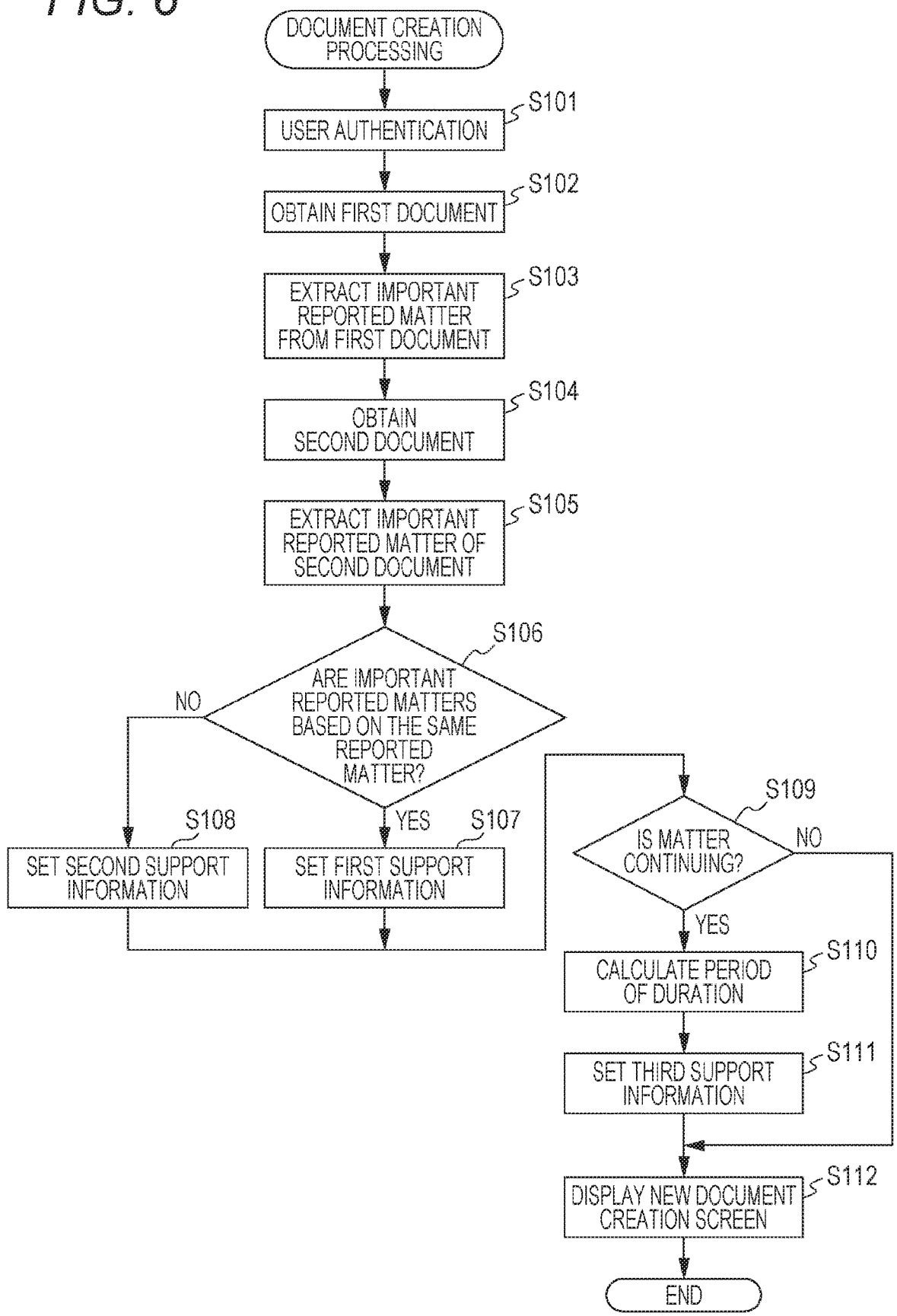
FIG. 6 is a flowchart illustrating an example of document creation processing executed by a control part of a document server.

FIG. 6 is a flowchart illustrating an example of document creation processing executed by the control part 11 of the document server 1. This processing is realized, for example, in the following manner: the client terminal 2 accesses the document server 1 to make a request to use a document creation system S, and consequently the CPU 111 of the document server 1 executes a document creation program stored in the storage part 12.

In a step S101, the control part 11 performs user authentication processing. For example, when the section chief M uses the client terminal 2 to access the document server 1, the control part 11 causes the client terminal 2 to display a login screen (refer to FIG. 7A). In the login screen, when the section chief M inputs a user ID and a password to perform login operation, the control part 11 determines whether or not the section chief M is an authorized user. Subsequently, in a case where the control part 11 authenticates the section chief M as an authorized user, the control part 11 permits the section chief M to use the document creation system S, and causes the client terminal 2 to display a document selection screen (refer to FIG. 7B).

It should be noted that a kind of document that can be created may be set beforehand according to, for example, user privilege. For example, in a case where the section chief M is a user, an overall document (an overall weekly report, an overall monthly report) is presented as a document that can be created. In a case where the person responsible A is a user, an individual document (an individual weekly report, an individual monthly report) is presented as a document that can be created.

Figure 8:
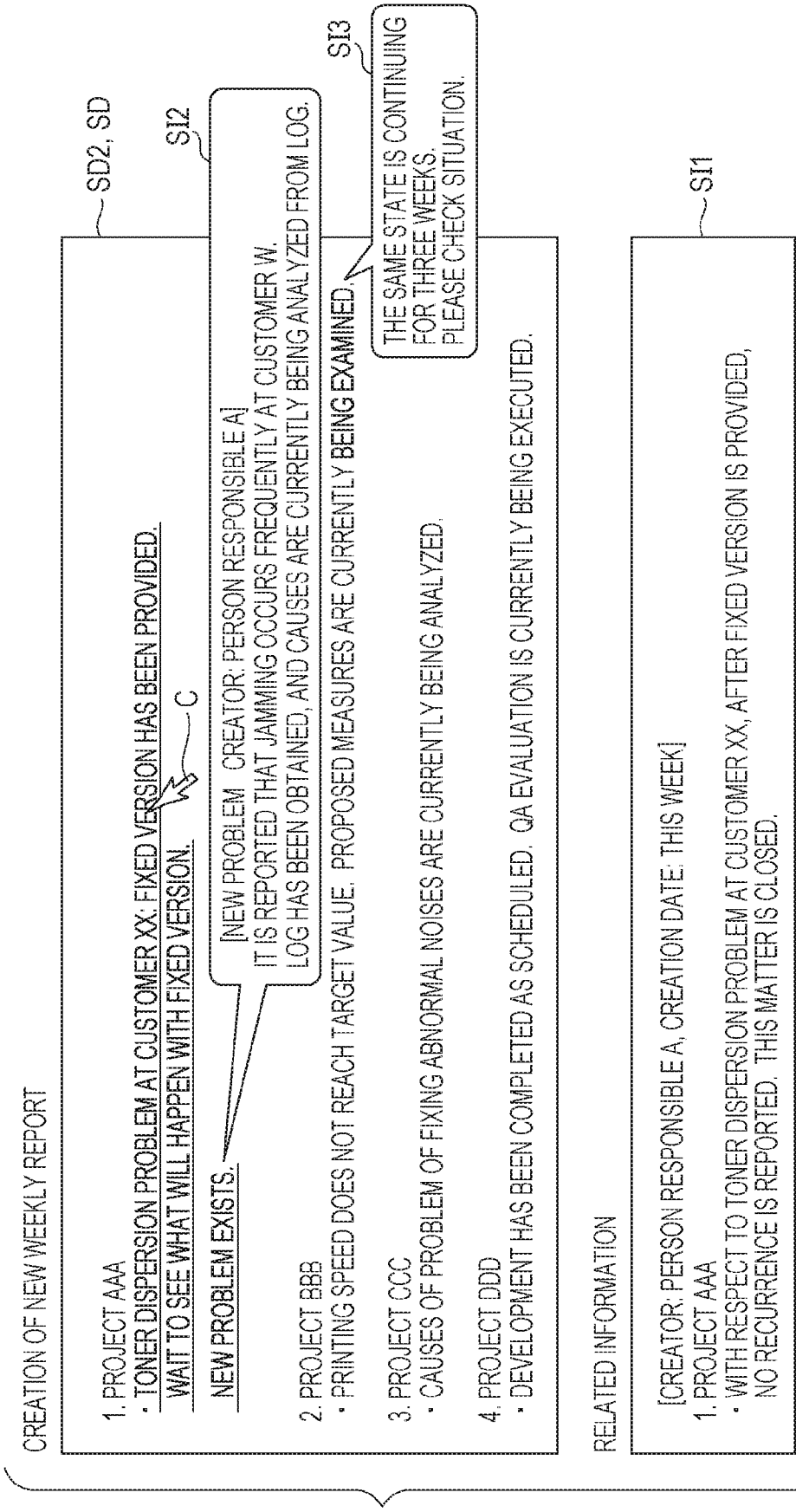
FIG. 8 is a drawing illustrating an example of a creation screen of a new document (a weekly report for this week).

When the user selects a kind of document to be created on the document selection screen shown in FIG. 7B, the client terminal 2 displays the document creation screen (refer to FIG. 8). At this point of time, processing of the steps S102 to S112 described below is executed, and consequently information that is displayed on the document creation screen is set.

In a step S102, the control part 11 obtains a first document that is used as a base when a new document is created (processing as the reported matter extraction part 11A). The first document is, for example, the most recent document that has been created by the user in the past. In a case where the section chief M creates the overall weekly report. SD2 for this week, the overall weekly report SD1 for last week is obtained as the first document. It should be noted that by allowing the user to refer to a document group registered in the document server 1, the user may be allowed to select, from among the documents, the first document that is used as a base.

In a step S103, the control part 11 extracts an important reported matter (hereinafter referred to as "first important reported matter") included in the overall weekly report SD1 (the first document) (processing as the reported matter extraction part 11A). In the present embodiment, a sentence, the importance flag of which is set at "ON", is extracted as the first important reported matter. For example, with respect to the overall weekly report SD1 for last week shown in FIG. 4A, from among the overall reported matters SR11 to SR14, the overall reported matters SR11 to SR13 each including a specific word (a word surrounded by a rectangular frame) are extracted as the first important reported matters.

In a step S104, the control part 11 obtains a second document that should be referred to when a new document is created (processing as the reported matter extraction part 11A). The second document is, for example, the individual weekly report D that has been created by a subordinate of the section chief M after the creation of the first document. It should be noted that by allowing the user to refer to a document group registered in the document server 1, the user may be allowed to select the second document from among the documents.

In a case where the number of second documents is two or more, the processing of the steps S104 to S108 is performed for each of the second documents. A case where the individual weekly report D2 for this week created by the person responsible A (refer FIG. 5A) has been obtained as the second document will be described below.

In a step S105, the control part 11 extracts an important reported matter (hereinafter referred to as "second important reported matter") included in the individual weekly report D2 (the second document) (processing as the reported matter extraction part 11A). In the present embodiment, a sentence, the importance flag of which is set at "ON", is extracted as the second important reported matter. For example, with respect to the individual weekly report D2 for this week shown in FIG. 5A, from among the individual reported matters R21 to R23, the individual reported matters R21, R22 each including a specific word (a word surrounded by a rectangular frame) are extracted as the second important reported matters.

In this manner, the reported matter extraction part 11A extracts an important reported matter from the overall reported matter SR1 (the first reported matter) and the individual reported matter R2 (the second reported matter). Specifically, the reported matter extraction part 11A calculates a total score indicating an importance level of the overall reported matter SR1 (the first reported matter) and/or the individual reported matter R2 (the second reported matter) on the basis of a score that has been registered beforehand to as to be associated with a character string, and then determines, on the basis of the total score, whether or not the overall reported matter SR1 and the individual reported matter R2 are important reported matters.

This enables to present support information related to a matter that should be grasped as a minimum, and therefore efficiency in document creation is enhanced. In addition, a processing load of the document server 1 can also be reduced.

In a step S106, the control part 11 determines whether or not the first important reported matter (the overall reported matters SR11 to SR13, refer to FIG. 4A) and the second important reported matter (the individual reported matters R21, R22, refer to FIG. 5A) are based on the same matter (processing as the sameness determination part 11B). This determination processing is performed, for example, by checking whether or not the first important reported matter and the second important reported matter each include the same specific word. In a case where the first important reported matter and the second important reported matter are based on the same matter, the process proceeds to processing of a step S107. In a case where the first important reported matter and the second important reported matter are not based on the same matter, the process proceeds to processing of a step S108.

Here, in a case where the number of the first important reported matters and/or the number of the second important reported matters are two or more, the processing of the steps S106 to S108 is performed for all combinations. The individual weekly report D2 shown in FIG. 5A includes two individual reported matters R21, R22 as the second important reported matters; and the overall weekly report SD1 shown in FIG. 4A includes three overall reported matters SR11 to SR13 as the first important reported matter. Therefore, in this case, the sameness of important reported matters is determined for six possible combinations.

Specifically, the individual reported matter R21 extracted as the second important reported matter includes specific words of "jamming" and "frequent occurrence". Meanwhile, the overall reported matters SR11 to SR13 extracted as the first important reported matters do not include the specific words "jamming" and "frequent occurrence". Therefore, it is determined that the individual reported matter R21 is not based on the same matter as the first important reported matter. In this case, the individual reported matter R21 is a new reported matter that differs from the overall reported matters SR11 to SR13.

In addition, the individual reported matter R22 extracted as the second important reported matter includes a specific word of "toner dispersion". Meanwhile, the overall reported matter SR11 extracted as the first important reported matter also includes the specific word of "toner dispersion". In addition, the individual reported matter R22 and the overall reported matter SR11 share the same title TTL. Therefore, it is determined that the individual reported matter R22 is based on the same matter as the overall reported matter SR11. In this case, the individual reported matter R22 indicates the progress related to the overall reported matter SR11. It should be noted that although the sameness of important reported matters can be determined only by the comparison of specific words included in main texts, the sameness can be more properly determined by comparing titles corresponding to the main texts.

In the step S107, the control part 11 sets first support information as support information to be presented to the client terminal 2 (processing as the support information presentation part 11C). The first support information is information indicating that report contents have been changed. For example, information related to the individual reported matter R22 is set as the first support information.

In the step S108, the control part 11 sets second support information as support information to be presented to the client terminal 2 (processing as the support information presentation part 11C). The second support information is information indicating that new report contents have been created. For example, information related to the individual reported matter R21 is set as the second support information.

Moreover, in a step S109, the control part 11 determines whether or not the first important reported matter includes report contents indicating a continuation state (processing as the reported matter extraction part 11A, the sameness determination part 11B, and the support information presentation part 11C). This determination processing is performed, for example, by checking whether or not the first important reported matter includes a continuation word (for example, "currently being examined"). In a case where the first important reported matter includes report contents indicating a continuation state, the process proceeds to processing of a step S110. In a case where the first important reported matter does not include report contents indicating a continuation state, the process proceeds to processing of a step S112.

In a step S110, the control part 11 calculates a period of duration indicating how long a similar state continues (processing as the reported matter extraction part 11A, the sameness determination part 11B, and the support information presentation part 11C). For example, as with the steps S104 to S106, when a new document is created, a past overall weekly report SD3 is obtained as the second document that should be referred to, and the period of duration can be calculated by determining the sameness between the second important reported matter and the first important reported matter. For example, in a case where report contents that are similar to those of the overall reported matter SR13 in the overall weekly report SD1 for last week are also included in the second important reported matter extracted from the overall weekly report SD3 for the week before last, the period of duration is at least two weeks or more.

In a step S111, the control part 11 sets third support information as support information to be presented to the client terminal 2 (processing as the support information presentation part 11C). The third support information is information indicating that a certain state is continuing for a fixed period of time, and attention is required.

In the step S112, the control part 11 causes the client terminal 2 to display a creation screen of the overall weekly report SD2 for this week (new document) (processing as the support information presentation part 11C). At this point of time, support information that has been set in the steps S107, S108 and S111 is presented together with report contents of the overall weekly report SD1 for last week that is used as a base.

FIG. 8 is a drawing illustrating an example of a creation screen of a new document. FIG. 8 shows a case where the overall weekly report SD2 for this week is created on the basis of the overall weekly report SD1 for last week.

As shown in FIG. 8, the creation screen of the overall weekly report SD2 includes all reported matters of the overall weekly report SD1 for last week (refer to FIG. 4A). Further, first support information S11, second support information S12, and third support information S13 are presented. In addition, character strings with which the support information S11 to S13 are associated are highlighted with bold letters.

In an example shown in FIG. 8, the first support information S11 is displayed in a display frame of related information. In the display frame of related information, for example, information related to a sentence (character string) pointed by a cursor C is displayed. In FIG. 8, the sentence of "' The toner dispersion problem at the customer XX: . . . . Wait to see what will happen with the fixed version." is pointed by the cursor C. Therefore, information related to this sentence, in other words, information related to the individual reported matter R22 (refer to FIG. 5A), is displayed as the first support information S11.

In other words, in a case where the overall reported matter SR11 (the first reported matter) and the individual reported matter R22 (the second reported matter) are based on the same matter, the support information presentation part 11C presents information related to the individual reported matter R22 so as to be associated with the overall reported matter SR11. Specifically, referring to the individual reported matter R22, in a case where there is some progress an the overall reported matter SR11, the support information presentation part 11C presents, as the first support information, information indicating that: the overall reported matter SR11 should be updated.

This enables the section chief M to easily know that the report contents of the overall reported matter SR1 included in the overall weekly report SD1 for last week should be updated.

In addition, the second support information S12 is displayed in a balloon. In FIG. 8, a character string of "New problem exists" is displayed as a main text, and information related to the individual reported matter R21 (refer to FIG. 5A) is displayed so as to be associated with this character string.

In other words, in a case where the overall reported matter SR1 (the first reported matter) and the individual reported matter R2 (the second reported matter) are not based on the same matter, the support information presentation part 11C presents the second support information indicating that a new reported matter exists.

This enables the section chief M to easily know that a new problem has occurred in the same project as that of the overall reported matter SR11 included in the overall weekly report SD1 for last week.

In addition, the third support information S13 is displayed in a balloon. In FIG. 8, by being associated with a character string of "currently being examined", information indicating that the same state is continuing for a long time is displayed.

In other words, in a case where the overall reported matter SR12 (the first reported matter) and the past overall reported matter SR3 (the second reported matter) are based on the same matter, the support information presentation part 11C presents support information related to the past overall reported matter SR3 so as to be associated with the overall reported matter SR12. Specifically, referring to the past overall reported matter SR3 (the second reported matter), in a case where there is no prowess on the overall reported matter SR12 (the first reported matter), the support information presentation part 11C gives attention and advice on the overall reported matter SR12 as the third support information.

This enables the section chief M to easily know that the action related to the overall reported matter SR12 included in the overall weekly report SD1 for last week is delayed, and thus it is necessary to take early measures.

In this manner, on the basis of the overall weekly report SD1 for last week (the first document) that includes at least one overall reported matter SR1 (the first reported matter), the document server 1 (the document creation support device) according to the present embodiment supports work carried out when the overall weekly report SD2 for this week (new document) is created.

The document server 1 is provided with: the reported matter extraction part 11A that extracts the individual reported matter R2 (the second reported matter) related to the overall reported matter SR1 from the individual weekly report D2 for this week (the second document that differs from the first document); and the support information presentation part 11C that presents support information on the basis of the extracted individual reported matter R. In addition, the reported matter extraction part 11A extracts the overall reported matter SR3 (the second reported matter) related to the overall reported matter SR1 from the past overall weekly report SD3 (the second document that differs from the first document).

More specifically, the document server 1 is provided with the sameness determination part 11B that determines whether or not the overall reported matters SR1 to SR4 (the first reported matter) and the individual reported matters R21 to R23 (the second reported matter) are based on the same matter. The support information presentation part 11C presents information related to the individual reported matters R21 to R23 in a mode corresponding to the result of determination by the sameness determination part 11B.

According to the document server 1, the work efficiency achieved when a new document (for example, the overall weekly report SD2 for this week) is created on the basis of the first document (for example, the overall weekly report SD1 for last week) can be enhanced. For example, the section chief M creates the overall weekly report SD2 for this week while referring to the presented support information together with the overall weekly report SD1 for last week. Therefore, the important reported matter (for example, the progress of operations, the occurrence of a new problem) can be reliably reflected in the overall weekly report SD2 for this week. In addition, operations in which the action is delayed can be grasped, and therefore measures can be properly taken.

The invention made by the present inventors has been specifically described on the basis of the embodiments as above. However, the present invention is not limited to the above-described embodiments, and the present invention can be modified within the scope that does not deviate from the gist of the invention.

For example, the case where the section chief X creates the overall weekly report SD has been described in the embodiments. However, the present invention is useful for a case where an overall document is created by summarizing individual documents (for example, a daily report, a weekly report, a monthly report).

In addition, for example, in the embodiments, the most recent document that has been created by the user (the creator of a new document) in the past is obtained as the first document that is used as a base when the new document is created. However, the first document may be the most recent document that has been created by a person other than the user in the past.

Moreover, the second document that extracts the second reported matter related to the first reported matter included in the first document may be the most recent document that has been created by the user himself/herself in the past, or may be the most recent document that has been created by a person other than the user in the past. It should be noted that in a case where the most recent past document does not include the second reported matter related to the first reported matter, a range within which the second document is referred to may be widened retroactively to the past.

In the embodiments, the document server 1 functions as the document creation support device according to an embodiment of the present invention. However, the individual client terminal 2 may be adapted to function as the document creation support device. This can be realized, for example, by installing a document creation program in the client terminal 2. In this case, if the client terminal 2 is adapted to store the document, the document server 1 is not required. Further, while an introduced document management system is used in an operation mode without any change, the document creation support device according to an embodiment of the present invention can be realized. Furthermore, the document server 1 and the client terminal 2 may be adapted to function as a document creation device in cooperation with each other.

In the embodiments, the control part 11 of the document server 1 executes the document creation program 122, and consequently the document creation support device according to an embodiment of the present invention is realized. In other words, the document creation program 122 causes the control part 11 (the computer) of the document server 1 to execute: processing of extracting the second reported matter related to the first reported matter from the second document that differs from the first document; and processing of presenting support information on the basis of the extracted second reported matter.

The document creation program 122 can be provided through, for example, a computer readable transportable storage medium (including an optical disk, a magneto-optical disk, and a memory card) that stores the program 122. In addition, for example, the document creation program can also be provided by being downloaded through a network from a server that stores the program.

Although embodiments of the present invention have been described and illustrated in detail, the disclosed embodiments are made for purposes of illustration and example only and not limitation. The scope of the present invention should be interpreted by terms of the appended claims, and is intended to include all modifications within the meaning and range equivalent to the claims.

What is claimed is:

1. A document creation support device that supports work in creating a new document the document creation support device comprising:
a hardware processor that:
obtains a first document of a first predetermined type that is used as a base for creating the new document, wherein the new document is of the first predetermined type,
extracts, as a first reported matter, a character string including a predetermined specific word from the first document;
obtains a second document that is of a second predetermined type different from the first predetermined type;
extracts, as a second reported matter, a character string including a predetermined specific word from the second document;
determines whether the first reported matter and the second reported matter are based on the same matter, based on whether the first reported matter and the second reported matter contain the same predetermined specific word;
determines whether the first reported matter includes another predetermined specific word or words indicating a continuation state;
in a case in which it is determined that the first reported matter and the second reported matter are based on the same matter, sets, based on contents of the second reported matter extracted from the second document, first support information to be presented on a new document creation screen displayed on a client terminal, the first support information indicating that report contents relating to said same matter have changed;
in a case in which it is determined that the first reported matter and the second reported matter are based on different matters, sets, based on contents of the second reported matter, second support information to be presented on the new document creation screen displayed on the client terminal, the second support information indicating that new report contents have been created, the new report contents relating to a matter different from the matter on which the first reported matter is based;
in a case in which it is determined that the first reported matter includes said another predetermined specific word or words indicating the continuation state, (i) obtains a third document of the first predetermined type and that is older than the first document, (ii) determines a period of duration of the continuation state based on whether the third document includes a third reported matter that is based on the same matter as the first reported matter, and (iii) sets, based on contents of at least the first reported matter, third support information to be presented on the new document creation screen displayed on the client terminal, the third support information indicating that a certain state continues for a fixed period of time; and
display the new document creation screen on the display of the client terminal and present on the new document creation screen any of the first support information, the second support information, and the third support information that have been set, together with report contents of the first document that is used as the base for the new document.

2. The document creation support device according to claim 1, wherein in the case in which it is determined that the first reported matter and the second reported matter are based on the same matter, the hardware processor presents the first support information so as to be associated with the first reported matter.

3. The document creation support device according to claim 2, wherein the hardware processor refers to the second reported matter, and in a case in which it is determined by referring to the second reported matter that there is progress on the first reported matter, the hardware processor presents, as the first support information, that the first reported matter should be updated.

4. The document creation support device according to claim 2, wherein the hardware processor refers to the second reported matter, and in a case in which it is determined by referring to the first reported matter there is no progress on the first reported matter, the hardware processor gives attention and advice on the first reported matter as the third support information.

5. The document creation support device according to claim 1, wherein the hardware processor extracts an important reported matter from the first reported matter and the second reported matter.

6. The document creation support device according to claim 5, wherein the hardware processor calculates a total score indicating an importance level of at least one of the first reported matter and the second reported matter based on a score that has been registered beforehand so as to be associated with a character string, and determines, based on the total score, whether or not said at least one of the first reported matter and the second reported matter is an important reported matter.

7. The document creation support device according to claim 1, wherein:
the first document is a first overall document created based on a first individual document, and
the second document is a second individual document created after creation of the first overall document or a second overall document created before the creation of the first overall document.

8. A non-transitory recording medium having stored thereon a computer readable program that is executable by a computer that supports work in creating a new document, the program being executable by the computer to cause the computer to perform functions comprising:
obtaining a first document of a first predetermined type that is used as a base for creating the new document, wherein the new document is of the first predetermined type,
extracting, as a first reported matter, a character string including a predetermined specific word from the first document;
obtaining a second document that is of a second predetermined type different from the first predetermined type;
extracting, a second reported matter, a character string including a predetermined specific word from the second document;
determining whether the first reported matter and the second reported matter are based on the same matter, based on whether the first reported matter and the second reported matter contain the same predetermined specific word;
determining whether the first reported matter includes another predetermined specific word or words indicating a continuation state;
in a case in which it is determined that the first reported matter and the second reported matter are based on the same matter, setting, based on contents of the second reported matter extracted from the second document, first support information to be presented on a new document creation screen displayed on a client terminal, the first support information indicating that report contents relating to said same matter have changed;
in a case in which it is determined that the first reported matter and the second reported matter are based on different matters, setting, based on contents of the second reported matter, second support information to be presented on the new document creation screen displayed on the client terminal, the second support information indicating that new report contents have been created, the new report contents relating to a matter different from the matter on which the first reported matter is based;
in a case in which it is determined that the first reported matter includes said another predetermined specific word or words indicating the continuation state, (i) obtaining a third document of the first predetermined type and that is older than the first document, (ii) determining a period of duration of the continuation state based on whether the third document includes a third reported matter that is based on the same matter as the first reported matter, and (iii) setting, based on contents of at least the first reported matter, third support information to be presented on the new document creation screen displayed on the client terminal, the third support information indicating that a certain state continues for a fixed period of time; and
displaying the new document creation screen on the display of the client terminal and present on the new document creation screen any of the first support information, the second support information, and the third support information that have been set, together with report contents of the first document that is used as the base for the new document.

* * * * *